US011872934B2

(12) United States Patent
Jung et al.

(10) Patent No.: US 11,872,934 B2
(45) Date of Patent: Jan. 16, 2024

(54) VEHICLE INDOOR ILLUMINATION DEVICE

(71) Applicant: HYUNDAI MOBIS CO., LTD., Seoul (KR)

(72) Inventors: Ju Yeon Jung, Yongin-si (KR); Sang Hun Yoo, Yongin-si (KR); Chi Yun Han, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/145,692

(22) Filed: Dec. 22, 2022

(65) Prior Publication Data
US 2023/0365057 A1 Nov. 16, 2023

(30) Foreign Application Priority Data

May 10, 2022 (KR) .................. 10-2022-0057510

(51) Int. Cl.
| | |
|---|---|
| *B60Q 3/60* | (2017.01) |
| *F21V 3/04* | (2018.01) |
| *B60Q 3/10* | (2017.01) |
| *F21V 19/00* | (2006.01) |
| *F21Y 115/10* | (2016.01) |

(52) U.S. Cl.
CPC ............... *B60Q 3/60* (2017.02); *B60Q 3/10* (2017.02); *F21V 3/049* (2013.01); *F21V 19/0025* (2013.01); *F21Y 2115/10* (2016.08)

(58) Field of Classification Search
CPC ... B60Q 3/60; B60Q 3/50; B60Q 3/80; B60Q 3/74; B60Q 3/10–18; F21V 3/049; F21V 29/0025; F21Y 2115/10; B60K 37/00–06
See application file for complete search history.

(56) References Cited

U.S. PATENT DOCUMENTS

| | | | |
|---|---|---|---|
| 2011/0156588 A1* | 6/2011 | Brant ...................... | G09F 13/22 |
| | | | 362/519 |
| 2012/0300456 A1* | 11/2012 | Phillips, III .............. | F21V 5/04 |
| | | | 362/245 |
| 2015/0015457 A1* | 1/2015 | Takasu ................... | G02B 27/01 |
| | | | 345/7 |

FOREIGN PATENT DOCUMENTS

KR 10-2308901 B1 5/2021

OTHER PUBLICATIONS

Innovation Q+ NPL Search (Year: 2023).*

* cited by examiner

*Primary Examiner* — Anabel Ton
(74) *Attorney, Agent, or Firm* — NovoTechIP International PLLC

(57) ABSTRACT

A vehicle indoor illumination device includes a housing having an upper opening with an internal space formed therein, a light-emitting unit disposed on the housing to emit light, a diffuser disposed outside the light-emitting unit in a manner as to close the upper opening of the housing to allow the light emitted from the light-emitting unit to diffuse to the outside, a cover part disposed on an outer surface of the diffuser and on which a light pattern is formed through scattering of the light transmitted through the diffuser, and a controller configured to receive an operation signal of a vehicle electronic part to control an operation of the light-emitting unit.

7 Claims, 7 Drawing Sheets

400

400

VEHICLE INDOOR ILLUMINATION DEVICE

CROSS-REFERENCE TO RELATED APPLICATION

This application claims the benefit under 35 U.S.C. § 119(a) of priority to Korean Patent Application No. 10-2022-0057510 filed on May 10, 2022 in the Korean Intellectual Property Office, the entire disclosure of which is incorporated herein by reference for all purposes.

BACKGROUND

Technical Field

Exemplary embodiments of the present disclosure relate to a vehicle indoor illumination device and, more particularly, to a vehicle indoor illumination device installed on a dashboard.

Discussion of the Background

In a dashboard installed in front of a driver's seat and a passenger's seat in a vehicle, an instrument panel serves to protect a driver and a passenger seated on seats from a vehicle collision, and to display information about a function of a vehicle and a manipulation thereof through a screen and buttons assembled in Audio Video Navigation (AVN), etc.

Conventional information communication and manipulation are mostly performed by the AVN, and specifications such as the screen size of AVN is important for effective information communication and manipulation.

Currently, vehicle displays assembled in AVN have high manufacturing costs, causing a manufacturing cost-based problem in low-cost vehicle specifications to build a convenient environment for occupants through a large screen.

In particular, in the case of a vehicle with a low manufacturing cost while carrying a large number of occupants, such as a purpose built vehicle (PBV), there is an increasing need for an auxiliary means to effectively communicate information to occupants.

The Background of the present disclosure is disclosed in Korean Patent No. 10-2308901 (published on Oct. 5, 2021 and entitled "Vehicle Control Method, Apparatus, and System Using Dashboard Equipped with Transparent Conductive Film")

SUMMARY

Various embodiments are directed to a vehicle indoor illumination device capable of providing a differentiated manipulation environment and enhancing the marketability by integrating a communication lighting function into a dashboard.

Various embodiments are directed to a vehicle indoor illumination device capable of providing occupants with extended visual information, assisting an AVN infotainment screen.

Various embodiments are directed to a vehicle indoor illumination device capable of providing the optimization and manufacturing cost-saving by replacing a high-priced large-screen display.

Various embodiments are directed to a vehicle indoor illumination device capable of coping with the various needs of a future PBV and mobility market by applying various lighting resources, and capable of preoccupying the market through module development.

In an embodiment of the present disclosure, a vehicle indoor illumination device includes: a housing having an upper opening with an internal space formed therein; a light-emitting unit disposed on the housing to emit light; a diffuser disposed outside the light-emitting unit in a manner as to close the upper opening of the housing to allow the light emitted from the light-emitting unit to diffuse to the outside; a cover part disposed on an outer surface of the diffuser and on which a light pattern is formed through scattering of the light transmitted through the diffuser; and a controller configured to receive an operation signal of a vehicle electronic part to control an operation of the light-emitting unit.

The light-emitting unit may include a substrate fixed onto the housing; and a plurality of light-emitting elements surface-mounted on the substrate.

Each of the light-emitting element may be an RGB LED.

The light-emitting unit and the diffuser may be spaced apart from each other.

The cover part may be attached to the outer surface of the diffuser.

The cover part may be provided with a pattern portion in which a predetermined pattern is formed.

The internal space may include: a first space portion disposed on one side in the housing; and a second space portion disposed on the opposite side of the first space portion of the housing.

The housing may be a dashboard or an instrument panel.

The present disclosure has the effect of improving the marketability through integration and modularization of components by integrating the communication lighting function into the dashboard of a vehicle.

In addition, the present disclosure has the effect of providing differentiated operation environment and enhanced marketability by providing occupants with extended visual information, assisting the display screen mounted on the dashboard of a vehicle.

In addition, the present disclosure has the effect of reducing the weight and manufacturing cost of a vehicle by reducing the number of high-cost components such as large screen displays mounted on the dashboard of a vehicle.

In addition, the present disclosure has the effect of improving usability by extending a display area for an operation of e.g., an entertainment function, an air conditioning function, or the like beyond a display screen.

DETAILED DESCRIPTION OF THE ILLUSTRATED EMBODIMENTS

Figure 1:
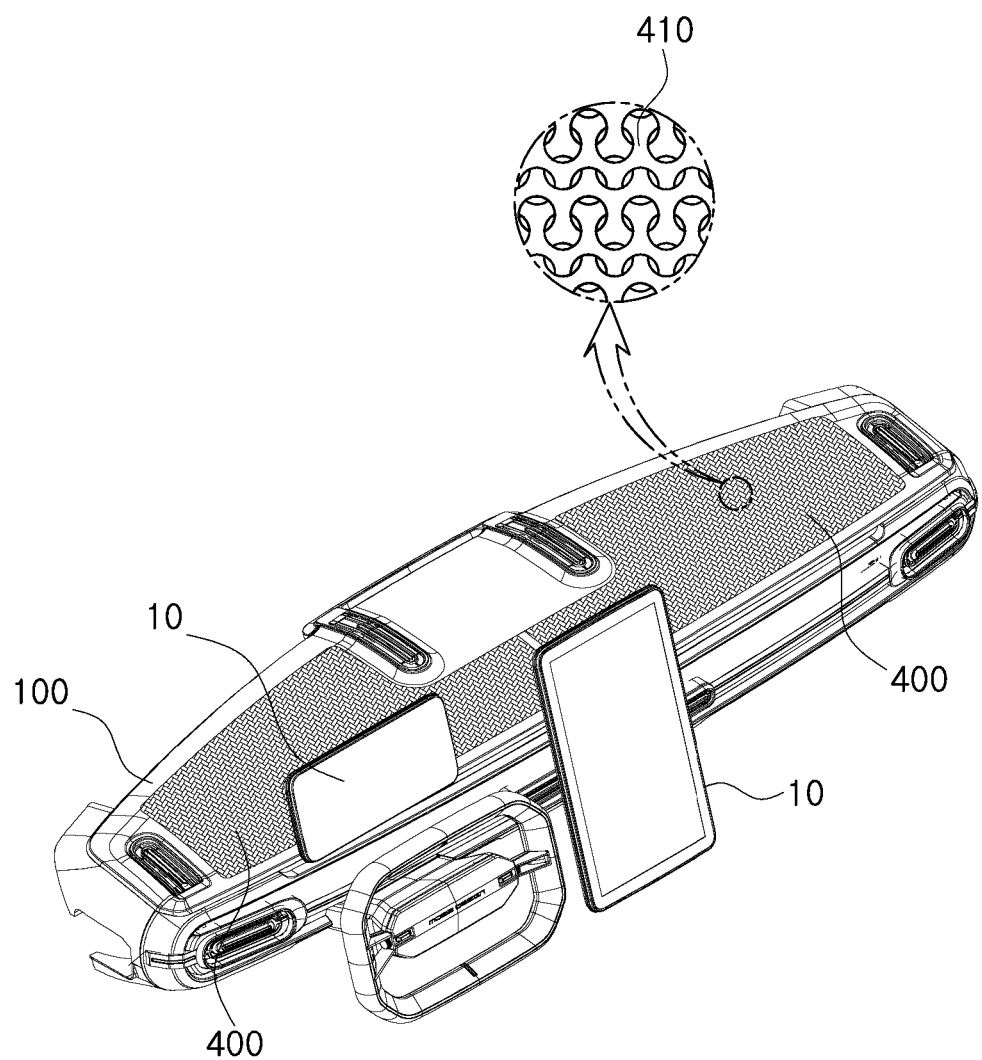
FIG. 1 is a perspective view illustrating an appearance of a vehicle indoor illumination device according to an embodiment of the present disclosure.

Hereinafter, an exemplary embodiment of a vehicle indoor illumination device will be described below with reference to the accompanying drawings. In the description, the thickness of the lines or the size of the components illustrated in the drawings may be exaggerated for clarity and convenience of explanation. In addition, the terms to be described later are terms defined in consideration of functions in the present disclosure, which may vary according to the user or operator's intention or practices in the art. Therefore, definitions of these terms should be made based on the content throughout this specification.

Figure 2:
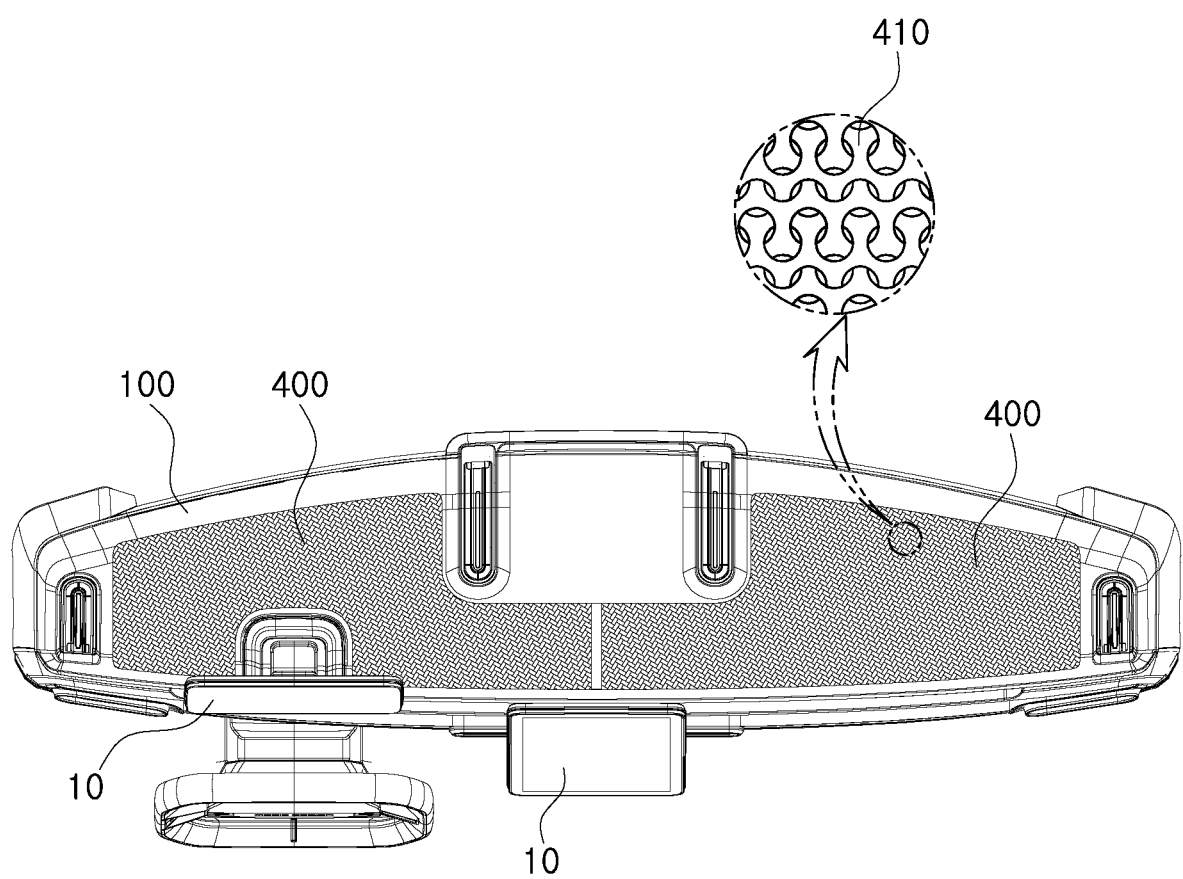
FIG. 2 is a plan view illustrating the vehicle indoor illumination device according to the embodiment of the present disclosure.
Figure 3:
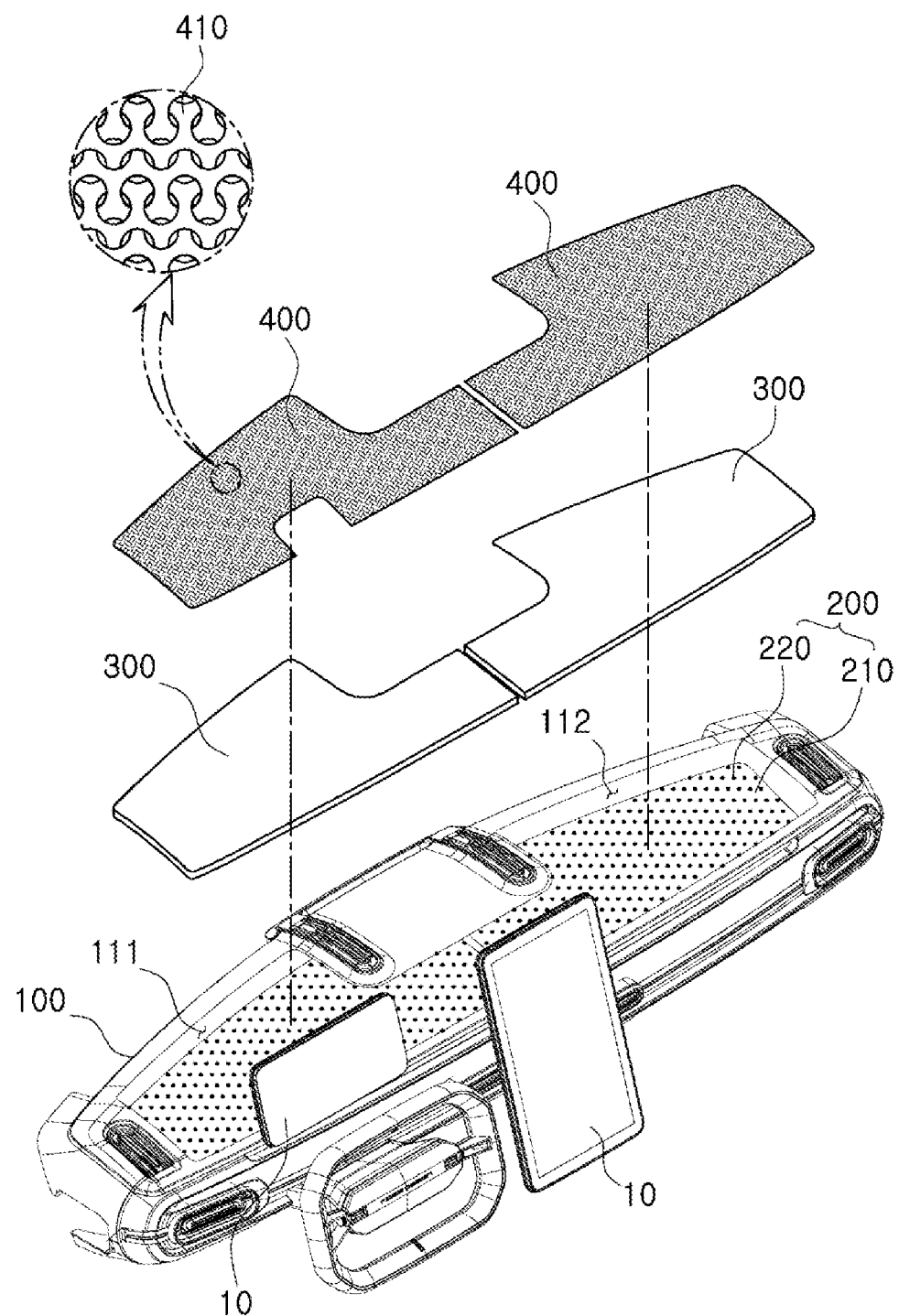
FIG. 3 is an exploded perspective view illustrating the vehicle indoor illumination device according to the embodiment of the present disclosure.
Figure 4:
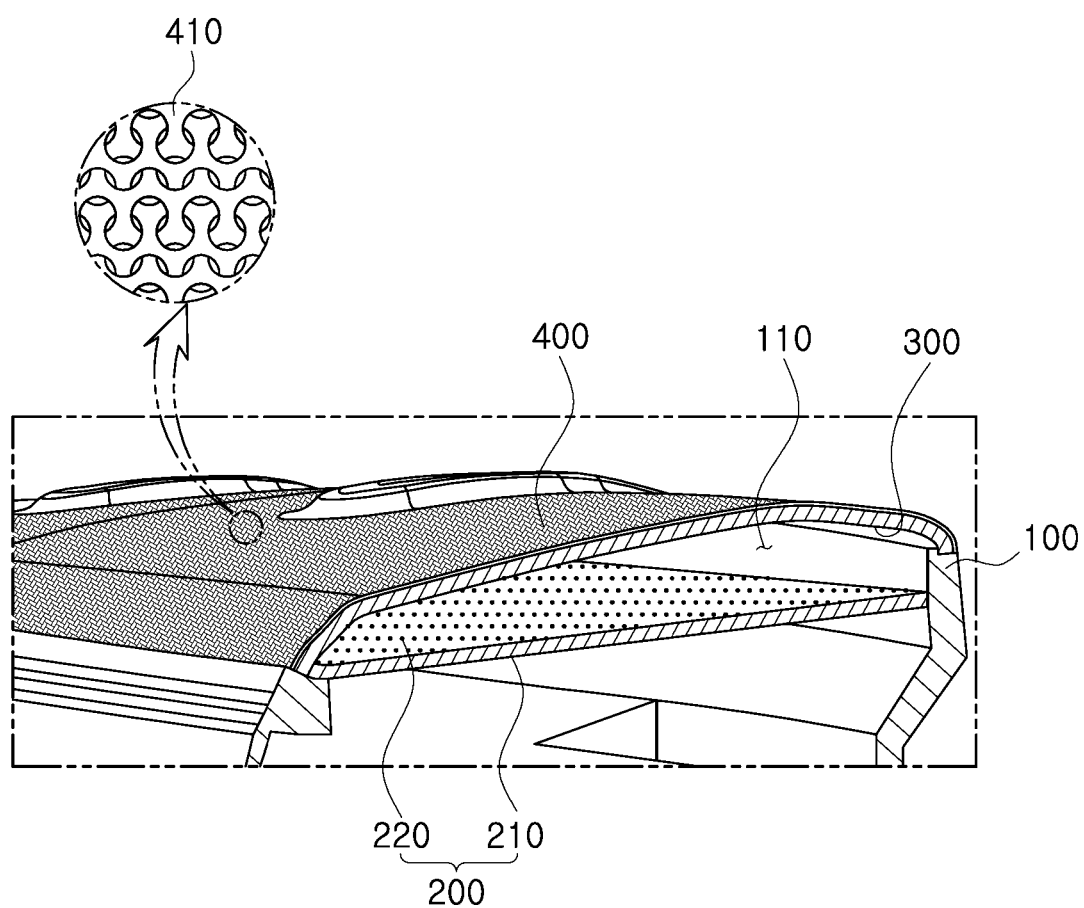
FIG. 4 is a cross-sectional view illustrating the vehicle indoor illumination device according to the embodiment of the present disclosure.
Figure 5:
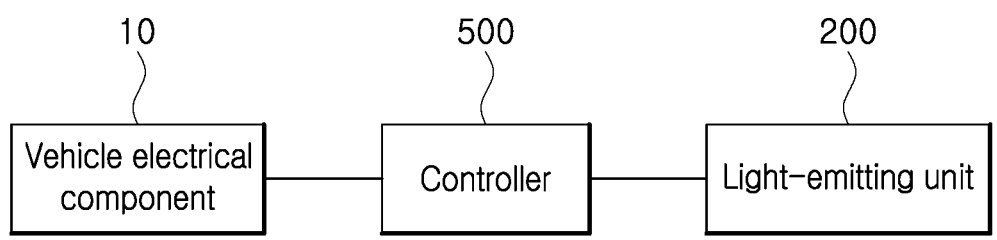
FIG. 5 is a block diagram illustrating a connection relationship between a controller and respective components in the vehicle indoor illumination device according to the embodiment of the present disclosure.

FIG. 1 is a perspective view illustrating an appearance of a vehicle indoor illumination device according to an embodiment of the present disclosure; FIG. 2 is a plan view illustrating the vehicle indoor illumination device according to the embodiment of the present disclosure; FIG. 3 is an exploded perspective view illustrating the vehicle indoor illumination device according to the embodiment of the present disclosure; FIG. 4 is a cross-sectional view illustrating the vehicle indoor illumination device according to the embodiment of the present disclosure; and FIG. 5 is a block diagram illustrating a connection relationship between a controller and respective components in the vehicle indoor illumination device according to the embodiment of the present disclosure.

Referring to FIGS. 1 to 5, the vehicle indoor illumination device according to the embodiment of the present disclosure may include a housing 100, a light-emitting unit 200, a diffuser 300, a cover part 400, and a controller 500.

The housing 100 is provided in the interior of a vehicle, and may be a dashboard or an instrument panel installed in front of a driver's seat and a front passenger's seat. The present embodiment describes an example in which the housing 100 is a dashboard. However, the present disclosure is not limited thereto, and the housing 100 may be an instrument panel or other device.

An upper portion of the housing 100 may be formed to be opened so that the housing 100 has an upper opening with an internal space 110 defined therein by a sidewall thereof.

The upper surface of the housing 100 may be formed to be concaved downward so that the internal space 110 may be formed in the upper surface of the housing 100. As such, the housing 100 may be formed in various shapes such that the internal space 110 is provided thereon.

The light-emitting unit 200 is seated in the internal space of the housing 100. For example, the light-emitting unit 200 may be mounted on an inner surface of the housing 100 by steps formed on the inner surface (see FIG. 4). When the light-emitting part 200 is seated in the housing 100, the light-emitting unit 200 may divide the internal space 110 into an upper space part and a lower space part.

Accordingly, as illustrated in FIG. 4, the internal space of the housing 100 defined by the sidewall of the housing 100, i.e., the internal space 110, is divided into the upper space part and the lower space part by the light-emitting unit 200. That is, the light-emitting unit 200 may be disposed in a concave portion of the housing 100.

The light-emitting unit 200 emits light to the outside of the housing 100. The light-emitting unit 200 may include a substrate 210 and light-emitting elements 220.

The substrate 210 is a PCB substrate, which may be fixed to the housing 100 so as to be disposed in the internal space 110. The substrate 210 may be powered through a connection to a power supply device such as a battery or an alternator mounted on a vehicle.

The light-emitting elements 220 are composed of a plurality of RGB LEDs, and may be surface-mounted on the upper surface of the substrate 210. The light-emitting elements 220 may be implemented as other elements rather than the LEDs.

The diffuser 300 is formed in a planar shape and is disposed above the light-emitting unit 200 so as to be spaced apart from the light-emitting unit 200. The diffuser 300 is mounted on the upper side of the internal space 110 to close the upper portion of the housing 100, that is, the internal space 110.

The diffuser 300 refracts the light emitted from the light-emitting unit 200 to widely diffuse the light passing through the diffuser 300. The diffuser 300 may be made of a transparent or translucent material such that the light emitted from the light-emitting unit 200 is transmitted. As an example, the diffuser 300 may be made of a plastic (ABS) material such as acryl.

For example, the diffuser 300 made of acryl may be coated with a predetermined diffusion solution to form a diffusion coating layer, or may be corroded so that light passing through the acrylic diffuser is refracted.

The light emitted from the light-emitting unit 200 passes through the diffuser 300 disposed on an inner surface of the cover part 400 prior to passing through the cover part 400. Accordingly, it is possible to prevent the occurrence of a spot phenomenon in which light is irradiated straight forward from respective light-emitting elements 220 and stands out relatively brightly in the form of dots.

The cover part 400 may be provided on an outer surface of the diffuser 300 so that the light passing through the diffuser 300 may be scattered to form a constant light pattern. The cover part 400 may be attached to the upper surface of the diffuser 300 by an adhesive.

The cover part 400 may be made of a light-transmitting material. The cover part 400 may be made of a plastic (ABS) material. The cover part 400 may have a thickness thinner than that of the diffuser 300 in order to increase light transmission efficiency.

The cover part 400 may be provided with a pattern portion 410 in which a predetermined pattern is formed. The cover part 400 is fabricated through 3D printing, so that the pattern portion 410 having a specific pattern may be formed on the surface or the inside of the cover part.

The controller 500 is electrically connected to the substrate 210 of the light-emitting unit 200, and to various vehicle electrical components 10 mounted on a vehicle. Although the controller 500 may be disposed inside the housing 100, the present disclosure is not limited thereto, and the controller may also be disposed outside the housing 100.

Here, the vehicle electrical components 10 refer to a starting system for starting an engine, a cluster comprehensively providing information necessary for traveling and driving, an ABS system for securing the driver's steering safety upon slipping along the road surface, an auto air-conditioning control system which automatically controls the temperature and humidity of the vehicle interior, a back warning system (BWS) that identifies rear objects and generates an alert during reversing, a security system that prevents vehicle theft, a before service warning system (BSWS) that detects vehicle status and provides a driver with preventive maintenance information, an IT & GPS system, and an AVN system.

The controller 500 receives operation signals of the vehicle electrical components 10 to control the operation of the light-emitting unit 200. In other words, the controller 500 is electrically connected to the various vehicle electrical components 10 mounted on a vehicle to receive the operation signals of the respective vehicle electrical components 10.

Accordingly, when operation signals of respective vehicle electrical components 10 mounted on a vehicle are received by the controller 500, the light-emitting elements 220 are turned on/off, or flickered by the controller 500 that controls the light-emitting unit 200, so that a specific light pattern may be displayed.

The internal space 110 may include a first space part 111 located on the first side (left side in FIG. 2) with respect to the central portion of the upper surface of the housing 100, and a second space part 112 located on the second side (right side in FIG. 2) opposite to the first side.

The light-emitting unit 200, the diffuser 300, and the cover part 400 may be provided in each of the first space part 111 and the second space part 112. The controller 500 may control a light pattern to be displayed in a left-right symmetrical form through the light-emitting unit 200, the diffuser 300, and the cover part 400 provided in each of the first space 111 and the second space 112. Alternatively, the controller may individually control the light pattern to be displayed in a left-right asymmetrical form.

An operating process of the vehicle indoor illumination device having the above-described configuration according to an embodiment of the present disclosure will be described as follows.

Figure 6:
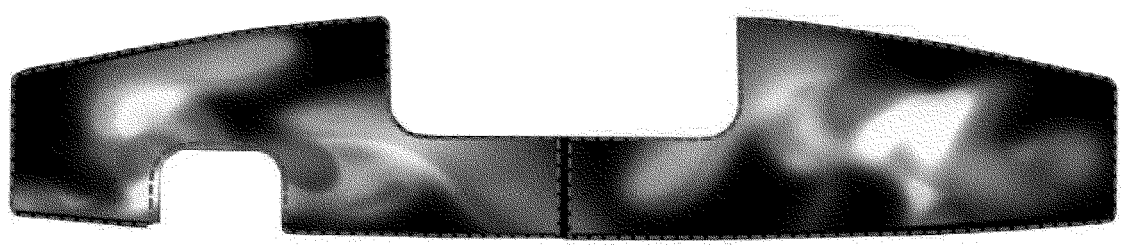
FIG. 6 is an exemplary diagram illustrating a first operational state of the vehicle indoor illumination device according to the embodiment of the present disclosure.
Figure 7:
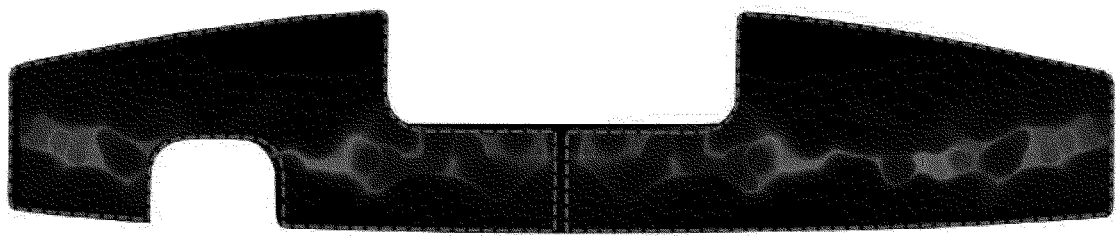
FIG. 7 is an exemplary diagram illustrating a second operational state of the vehicle indoor illumination device according to the embodiment of the present disclosure.
Figure 8:
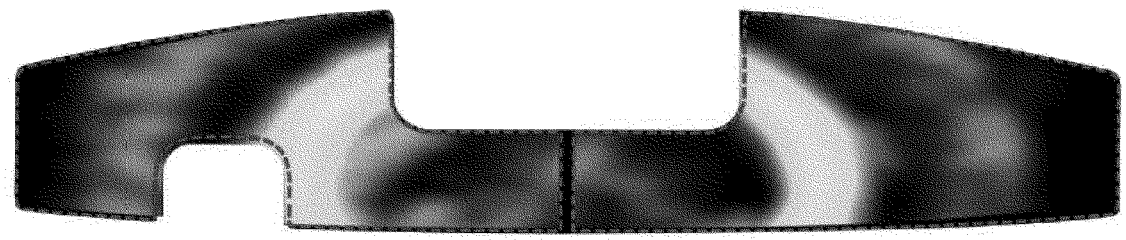
FIG. 8 is an exemplary diagram illustrating a third operational state of the vehicle indoor illumination device according to the embodiment of the present disclosure.
Figure 9:
FIG. 9 is an exemplary diagram illustrating a fourth operational state of the vehicle indoor illumination device according to the embodiment of the present disclosure.

FIG. 6 is an exemplary diagram illustrating a first operational state of the vehicle indoor illumination device according to the embodiment of the present disclosure; FIG. 7 is an exemplary diagram illustrating a second operational state of the vehicle indoor illumination device according to the embodiment of the present disclosure; FIG. 8 is an exemplary diagram illustrating a third operational state of the vehicle indoor illumination device according to the embodiment of the present disclosure; and FIG. 9 is an exemplary diagram illustrating a fourth operational state of the vehicle indoor illumination device according to the embodiment of the present disclosure.

Referring to FIGS. 1 to 5, and 6, when an operation signal of a corresponding vehicle electrical component 10 generated when a driver unlocks a vehicle door and sits in a vehicle, or starts an engine is received by the controller 500, the light-emitting elements 220 are turned on/off, or flicker so that a light pattern representing a welcome sequence operation is displayed on the outside of the housing 100.

Referring to FIGS. 1 to 5, and 7, when an input signal input by an occupant manipulating a display screen and buttons of corresponding vehicle electrical components 10 for activating e.g., an air conditioner on a dashboard is received by the controller 500, the light-emitting elements 220 are turned on/off, or flicker so that a light pattern representing a climate sequence operation is displayed on the outside of the housing 100 during the air conditioning operation.

Referring to FIGS. 1 to 5, and 8, when an input signal input by an occupant manipulating a display screen and buttons of corresponding vehicle electrical components 10 for activating e.g., an AVN on the dashboard is received by the controller 500, the light-emitting elements 220 are turned on/off, or flicker so that a light pattern representing an entertainment sequence operation linked with music and video playback is displayed on the outside of the housing 100.

Referring to FIGS. 1 to 5, and 9, when an external warning signal such as front, rear, and side collision warnings, an ABS operation of vehicle electrical components 10 is received by the controller 500, the light-emitting elements 220 are turned on/off, or flicker so that a light pattern representing a warning sequence operation is displayed on the outside of the housing 100.

The vehicle indoor illumination device according to the embodiment of the present disclosure can improve the marketability through integration and modularization of components by integrating the communication lighting function into the vehicle's dashboard.

In addition, the vehicle indoor illumination device according to the embodiment of the present disclosure can provide differentiated operation environment and enhanced marketability by providing occupants with extended visual information, assisting the display screen mounted on the dashboard of a vehicle.

In addition, the vehicle indoor illumination device according to the embodiment of the present disclosure can reduce the weight and manufacturing cost of a vehicle by reducing the number of high-cost components such as large screen displays mounted on the vehicle's dashboard.

In addition, the vehicle indoor illumination device according to the embodiment of the present disclosure can improve usability by extending a display area for an operation of e.g., an entertainment function, an air conditioning function, or the like beyond a display screen.

Although exemplary embodiments of the disclosure have been disclosed for illustrative purposes, those skilled in the art will appreciate that various modifications, additions and substitutions are possible. Therefore, the true technical scope of the disclosure should be defined by the following claims.

What is claimed is:

1. A vehicle indoor illumination device, comprising:
   a housing having an upper opening with an internal space formed therein;
   a light-emitting unit disposed on the housing to emit light;
   a diffuser disposed outside the light-emitting unit and configured to enclose the upper opening of the housing and allow the light emitted from the light-emitting unit to diffuse outside of the housing;
   a cover part disposed on an outer surface of the diffuser and on which a light pattern is formed through scattering of the light transmitted through the diffuser; and
   a controller configured to receive an operation signal to control an operation of the light-emitting unit,
   wherein the housing is a dashboard or an instrument panel.

2. The vehicle indoor illumination device according to claim 1, wherein the light-emitting unit comprises:
   a substrate within the housing; and
   a plurality of light-emitting elements surface-mounted on the substrate.

3. The vehicle indoor illumination device according to claim 2, wherein each of the light-emitting elements is an RGB LED.

4. The vehicle indoor illumination device according to claim 1, wherein the light-emitting unit and the diffuser are spaced apart from each other.

5. The vehicle indoor illumination device according to claim 1, wherein the cover part is attached to the outer surface of the diffuser.

6. The vehicle indoor illumination device according to claim 5, wherein the cover part is provided with a pattern portion in which a predetermined pattern is formed.

7. The vehicle indoor illumination device according to claim 1, wherein the internal space comprises:
- a first spatial portion disposed on one side in the housing; and
- a second spatial portion disposed on the opposite side of the first spatial portion of the housing.

* * * * *